United States Patent [19]

Koyanagi et al.

[11] Patent Number: 4,528,336

[45] Date of Patent: Jul. 9, 1985

[54] METHOD FOR PREVENTING POLYMER SCALE DEPOSITION IN POLYMERIZATION OF ETHYLENICALLY UNSATURATED MONOMERS

[75] Inventors: Shunichi Koyanagi, Kanagawa; Hajime Kitamura; Toshihide Shimizu, both of Chiba; Ichiro Kaneko, Ibaraki, all of Japan

[73] Assignee: Shin-Etsu Chemical Co., Ltd., Tokyo, Japan

[21] Appl. No.: 361,040

[22] Filed: Mar. 23, 1982

[30] Foreign Application Priority Data

Mar. 23, 1981 [JP] Japan ............................ 56-42020

[51] Int. Cl.$^3$ ............................................... C08F 2/20
[52] U.S. Cl. ..................................... 526/62; 526/200; 526/202
[58] Field of Search ............................................... 526/62

[56] References Cited

U.S. PATENT DOCUMENTS

| | | | |
|---|---|---|---|
| 4,024,301 | 5/1977 | Witenhafer | 526/62 |
| 4,024,330 | 5/1977 | Morningstar | 526/62 |
| 4,220,743 | 9/1980 | Englin | 526/62 |
| 4,355,141 | 10/1982 | Okada | 526/62 |

*Primary Examiner*—Christopher A. Henderson
*Attorney, Agent, or Firm*—Toren, McGeady, Stanger, Goldberg & Kiel

[57] ABSTRACT

The invention provides a very efficient method with highly durable effect for preventing polymer scale deposition on the reactor walls and other surfaces coming into contact with the monomer during polymerization of an ethylenically unsaturated polymerizable monomer in an aqueous medium such as in the suspension polymerization of vinyl chloride. The method comprises coating the reactor walls, prior to polymerization, with a novel coating material which is a condensation product obtained by the condensation reaction of an aromatic amine compound such as aniline and an aromatic nitro compound such as nitrobenzene in the presence of a mineral acid and a specified condensation catalyst. It is sometimes preferable that the condensation product is basified or treated with an alkali or ammonium compound to be imparted with a modified solubility behavior.

5 Claims, No Drawings

METHOD FOR PREVENTING POLYMER SCALE DEPOSITION IN POLYMERIZATION OF ETHYLENICALLY UNSATURATED MONOMERS

BACKGROUND OF THE INVENTION

The present invention relates to a method for the polymerization of an ethylenically unsaturated monomer or, more particularly, to a method for preventing polymer scale deposition on the reactor walls or other surfaces in the polymerization of an ethylenically unsaturated monomer in an aqueous polymerization medium exhibiting an effect so versatile as hardly to be affected by various parameters such as kind of the monomer polymerized, type of the polymerization, formulation of the polymerization mixture, for example, in respect of the polymerization initiator, stabilizer and the like, and so on.

As is well known, the polymerization of an ethylenically unsaturated monomer or, in particular, vinyl monomer is carried out by the method of suspension polymerization, emulsion polymerization, solution polymerization, vapor-phase polymerization or bulk polymerization. Whatsoever the type of the polymerization may be, one of the most serious problems in practicing the polymerization in an industrial scale is the deposition of the polymer scale on the surfaces of the inner walls of the polymerization reactor and other parts coming into contact with the monomer during polymerization such as the stirrer and the like.

To explain it, polymer scale is deposited almost always on the inner walls of the polymerization reactor, surface of the stirrer and other surfaces coming into contact with the monomer when a vinyl monomer is polymerized in either one of the above mentioned polymerization methods so that several disadvantages are unavoidable. For example, the yield of the polymer product naturally is decreased by the amount of the polymer scale, the cooling capacity of the polymerization reactor is greatly reduced due to the poor heat conductivity of the polymer scale built up on the reactor walls resulting in decreased productivity of the reactor and the polymer scale coming off the reactor walls enters the polymer product leading to the lowered quality of the product. In addition, the polymer scale once built up on the reactor walls and the like can be removed only with great consumption of time and labor which also increases the overall production cost of the polymer product. Moreover, polymer scale is relatively highly absorptive of the unreacted monomer so that the workers for the removal of the polymer scale are exposed to a great danger against their health as is the most serious recent problem in the polymer industry, especially, when the monomer is toxic as is vinyl chloride.

Needless to say, there have been made various attempts to solve this difficult problem of polymer scale deposition and the suspension polymerization of vinyl chloride in an aqueous medium is almost always carried out by undertaking a means for polymer scale prevention. The prevention of polymer scale deposition is performed either by providing coating on the reactor walls prior to the polymerization with certain compounds, for example, such as amine compounds, quinone compounds, aldehyde compounds and the like as an organic polar compound or by adding one or more of these compounds into the aqueous polymerization medium in the course of the polymerization. These methods have their respective disadvantages and there is known no satisfactory method capable of exhibiting sufficient effect of preventing polymer scale deposition. For example, the effect of the method of coating is not so durable that the effect of polymer scale prevention is lost after 5 to 6 runs of repeated polymerization after coating.

Further, the method of coating with a polar organic compound is effective only in the suspension polymerization of vinyl chloride by use of a monomer-soluble polymerization initiator but little effective in the emulsion polymerization by use of a water-soluble polymerization initiator or in the polymerization in which the polymerization medium contains a surface active agent. For example, Japanese Patent Kokai No. 53-13689 teaches a method for preventing polymer scale deposition in the emulsion polymerization of a vinyl monomer by use of a water-soluble polymerization initiator and a surface active agent, according to which the polymerization is carried out in a polymerization reactor having walls coated with an oxidative condensation product of an aromatic amine compound. This method is indeed effective to some extent for preventing polymer scale deposition presumably due to the stability of the above mentioned oxidative condensation product or the intermediate thereof against oxidative decomposition with insusceptibility to the attack of the oxidizing water-soluble polymerization initiator. The effectiveness of polymer scale prevention is, however, far from satisfactory when a vinyl monomer is polymerized in a polymerization reactor having inner walls coated with the oxidative condensation product of the aromatic amine compound.

SUMMARY OF THE INVENTION

An object of the present invention is therefore to provide a novel and effective means for preventing polymer scale deposition on the reactor walls in the polymerization of an ethylenically unsaturated monomer in an aqueous medium capable of exhibiting an effect so strong and durable that the difficult problem of the polymer scale prevention can be solved almost satisfactorily regardless of the types of the polymerization, kinds of the monomers and other parameters.

The method of the present invention for preventing polymer scale deposition on the reactor walls in the polymerization of an ethylenically unsaturated monomer in an aqueous medium contained in a polymerization reactor comprises providing a coating layer on the surface of the reactor walls with a condensation product obtained by the condensation reaction of an aromatic amine compound and an aromatic nitro compound in the presence of a mineral acid and a specified condensation catalyst at a temperature in the range from 100° to 250° C.

It is sometimes advantageous that coating with the condensation product of the aromatic amine and nitro compounds is carried out after the condensation product is basified by use of an alkali or ammonia to have an improved solubility behavior.

DETAILED DESCRIPTION OF THE PREFERRED EMBODIMENTS

The above described method of the present invention is very effective in preventing polymer scale deposition on the reactor walls and the surfaces of other parts such as stirrer coming into contact with the monomer during polymerization of the monomer in an aqueous medium. This effect is so strong in both suspension polymerization and emulsion polymerization that the advantage of the method is hardly affected by the kind of the monomer or monomers, formulation of the polymerization mixture and other parameters. In particular, the effect of preventing polymer scale deposition according to the invention is very durable over numbers of repeated runs of the polymerization regardless of the type of the polymerization initiator which may be water-soluble or monomer-soluble.

It should be noted that coating of the reactor walls with the aromatic amine compound as such is little effective in preventing polymer scale deposition. Further, the oxidative condensation product of the aromatic amine compound is not sufficiently effective, as is mentioned above, as a coating material for preventing polymer scale deposition. On the contrary, the condensation product prepared by the condensation reaction of an aromatic amine compound and an aromatic nitro compound in the presence of a mineral acid and a specified condensation catalyst as well as a basified product thereof is very effective. This remarkable difference is presumably due to the insusceptibility of these coating materials to the oxidative attack of the polymerization initiator and the strong absorption of these coating materials on to the reactor walls when a coating layer is provided thereof resulting in preventing the absorption of various species in the polymerization mixture which may be the initiation of the polymer scale deposition.

The scale-preventing coating material used in the present invention for providing a coating layer on the reactor walls is a condensation product prepared by the condensation reaction of an aromatic amine compound and an aromatic nitro compound in the presence of a mineral acid and a specified condensation catalyst as well as a basified product thereof with an alkali or ammonium compound such as sodium hydroxide, sodium carbonate, potassium hydroxide, ammonia, ammonium carbonate and the like. The condensation product as implied here means not only the final product of the condensation reaction but also the products at various intermediate stages of the condensation reaction.

The aromatic amine compound as one of the reactants of the condensation reaction with the aromatic nitro compound is a compound represented by the general formula

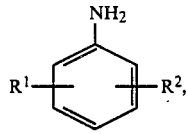

in which $R^1$ is a hydrogen atom, chlorine atom or a group selected from the class consisting of amino, phenylazo —N=N—$C_6H_5$, hydroxy, acetyl, methoxy, phenylamino, aminophenylamino, methoxyphenylamino, dimethylamino, hydroxyphenylamino and acetylamino groups as well as alkyl groups having from 1 to 3 carbon atoms and $R^2$ is a hydrogen atom, amino group, hydroxy group or methyl group.

Exemplary of such an aromatic amino compound are: aniline, 1,2-, 1,3- and 1,4-phenylenediamines, 2-, 3- and 4-aminophenols, 2-, 3- and 4-chloroanilines, 4-aminoazobenzene, 2,4-diaminoazobenzene, 4-aminoacetanilide, 2-, 3- and 4-methylanilines, 4-aminodiphenylamine, 2-aminodiphenylamine, 4,4'-diaminodiphenylamine, N,N-dimethyl-1,4-phenylenediamine, 4-amino-3'-methoxyydiphenylamine, 4-amino-4'-hydroxydiphenylamine, 4-chloro-1,2-phenylenediamine, 4-methoxy-1,2-phenylenediamine, 2-amino-4-chlorophenol, 2,3-diaminotoluene and the like, among which particularly preferred are aniline, 1,2-, 1,3- and 1,4-phenylenediamines, 2-, 3- and 4-aminophenols, 4-aminodiphenylamine and 4,4'-diaminodiphenylamine.

The other reactant to be reacted with the above named aromatic amine compound is an aromatic nitro compound represented by the general formula

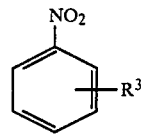

in which $R^3$ is a hydrogen atom, chlorine atom or a group selected from the class consisting of hydroxy, methoxy, ethoxy, amino, carboxyl —COOH and sulfo —$SO_2OH$ groups.

Exemplary of such an aromatic nitro compound are: nitrobenzene, 2-, 3- and 4-nitrophenols, 2-, 3- and 4-nitroanisoles, 2-, 3- and 4-nitrophenetoles, 2-, 3- and 4-chloronitrobenzenes, 2-, 3- and 4-nitroanilines, 2-, 3- and 4-nitrobenzoic acids, 2-, 3- and 4-nitrobenzenesulfonic acids and the like, among which particularly preferred are nitrobenzene, 2-, 3- and 4-nitrophenols, 2-, 3- and 4-nitrobenzoic acids and 2-, 3- and 4-nitrobenzenesulfonic acids.

The condensation reaction of the above named aromatic amine and nitro compounds is carried out in the presence of a mineral acid and a condensation catalyst. Suitable mineral acids are hydrochloric acid, sulfuric acid, nitric acid, phosphoric acid and hydrobromic acid, of which the former two are preferred.

The condensation catalyst is preferably an oxidizing compound selected from the class consisting of permanganic acid, permanganates such as potassium permanganate, chromic acid and related compounds such as chromium trioxide, potassium bichromate and sodium chlorochromate, heavy metal nitrates such as silver nitrate and lead nitrate, halogens such as iodine, bromine and chlorine, inorganic and organic peroxides such as hydrogen peroxide, sodium peroxide, dibenzoyl peroxide, potassium persulfate, ammonium persulfate, peracetic acid, cumene hydroperoxide, perbenzoic acid and p-menthane hydroperoxide, oxyacids and salts thereof such as iodic acid, sodium and potassium iodates and sodium and potassium chlorates, metal salts such as iron(III) chloride, copper sulfate, copper(II) chloride and lead acetate, ozone and metal oxides such as copper oxide, mercury oxide, cerium oxide, manganese dioxide and osmic acid. Iron(II) chloride and copper(I) chloride may be used. It is sometimes advantageous that a small amount of iron(II) chloride is used in combination with hydrogen peroxide. Among the above named oxidative condensation catalysts, particularly preferred are hydrogen peroxide as combined with iron(II) chloride, dibenzoyl peroxide, potassium persulfate, ammonium persulfate, p-menthane hydroperoxide, iodic acid, sodium and potassium iodates, sodium and potassium chlorates, iron(III) chloride, copper(II) chloride and manganese dioxide.

The condensation product to be used as the coating material is obtained by heating a mixture of the above mentioned aromatic amine and nitro compounds containing a mineral acid and a condensation catalyst at a temperature from 100° to 250° C. or, preferably, from 150° to 250° C. for 10 to 30 hours. The mixing ratio of the aromatic amine and nitro compounds is preferably in such a range that from 0.10 to 0.50 mole of the aromatic nitro compound is combined with 1 mole of the aromatic amine compound and about 2 moles of the amino groups in the amine compound are reacted with 1 mole of the nitro groups in the nitro compound so that it is usual that certain amount of the aromatic amine compound is left unreacted in the reaction mixture at the completion of the condensation reaction, which can readily be detected by the disappearance of the free nitro compound by gas chromatography.

The performance of the condensation product as the coating material for polymer scale prevention depends on various parameters such as the kinds of the aromatic amine and nitro compounds or combination thereof, kinds of the mineral acid and the condensation catalyst, the ratio of the reactants as well as the amounts of the mineral acid and the catalyst, temperature and time of the condensation reaction and the like. For example, an excessive amount of the aromatic nitro compound or imcompleteness of the reaction is undesirable resulting in the free unreacted nitro compound remaining in the reaction product to cause decreased effect of polymer scale prevention. Preferable amounts of the mineral acid and the condensation catalyst are from 0.03 to 0.50 mole and from 0.20 to 0.50 mole, respectively, per mole of the aromatic amine compound.

It is an alternative way that the aromatic amine compound alone is first subjected to the reaction in the presence of a mineral acid and a condensation catalyst and the reaction product is further reacted with the aromatic nitro compound to give a condensation product, which is equally effective for polymer scale prevention as the co-condensation product of the aromatic amine and nitro compounds.

The condensation product as the coating material is usually soluble in lower alcohols such as methyl and ethyl alcohols so that coating of the reactor walls is performed with a solution of the condensation product in such an alcoholic solvent.

It is further unexpectedly discovered that the solubility behavior of the condensation product may be modified when the condensation product is basified with an alkali or ammonium compound such as sodium hydroxide, sodium carbonate, potassium hydroxide, ammonia, ammonium carbonate and the like. For example, from 10 to 20 parts by weight of the alkali or ammonium compound are added to 100 parts by weight of the condensation product and the mixture is heated at 90° to 140° C. The amount of the alkali or ammonium compound should be sufficient to neutralize the mineral acid used in the condensation reaction of the aromatic amine and nitro compounds. After completion of the basification, the product is washed with water to remove excessive amount of the alkali or ammonium compound. The thus basified product is soluble in various organic solvents such as toluene and the like hydrocarbon solvents and chlorinated hydrocarbon solvents such as methylene chloride. While it is highly desirable in practice that the organic solvent sued for coating is non-flammable in view of the safety from the problems of fire or explosion, the solubility of the basified product in the chlorinated hydrocarbon solvent is advantageous owing to the non-flammability of such chlorinated solvents.

Besides the above mentioned organic solvents, various types or organic solvents may be used for dissolving the basified product including ester solvents, ketone solvents and non-protonic solvents such as dimethylformamide, dimethylsulfoxide, acetonitrile and the like.

The condensation product of the aromatic amine and nitro compounds or the basified product thereof is dissolved in an organic solvent or a solvent mixture to give a coating solution of a suitable concentration, which is preferably at least 0.01% by weight. When the concentration of the coating solution is too low, a desired coating amount on the reactor walls can be obtained only by repeating application of the solution and drying. On the other hand, an excessively high concentration of the coating solution is economically undesirable since no additional advantages are obtained even with an excessive thickness of the coating layer so that the upper limit of the concentration of the coating solution is about 5% by weight though not particularly limitative.

The method of the present invention is performed by coating the inner walls of the polymerization reactor and other surfaces coming into contact with the monomer or monomers during polymerization with the above prepared coating solution followed by drying. Drying of the coated surface can be effected by blowing hot air on the wet surface or alternatively the reactor walls are heated in advance, for example, at 30° to 90° C. and the application of the coating solution is performed on the thus heated surface. At any rate, it is essential that the coated surface is sufficiently dried followed, if necessary, by washing with water before introduction of the polymerization mixture into the thus treated polymerization reactor.

The coating amount on the surface as dried is in the range from 0.001 to 5 g/m$^2$ or, preferably, from 0.01 to 1.0 g/m$^2$ in order that the desired effect of polymer scale prevention can be satisfactorily exhibited.

The method of the present invention is effective for the suspension polymerization and emulsion polymerization of an ethylenically unsaturated monomer or, in particular, vinyl monomer in an aqueous polymerization medium. Accordingly, the polymerization mixture contains various kinds of additive ingredients including suspending agents such as partially saponified polyvinyl alcohol and methylcellulose, anionic surface active agents such as sodium laurylsulfate, sodium dodecylbenzenesulfonate and sodium dioctyl sulfosuccinate, nonionic surface active agents such as sorbitan monolaurate and polyoxyethylene alkyl ether, fillers such as calcium carbonate and titanium dioxide, stabilizers such as tribasic lead sulfate, calcium stearate, dibutyltin dilaurate and dioctyltin mercaptide, lubricants such as rice wax and stearic acid, plasticizers such as dioctyl phthalate and dibutyl phthalate, chain transfer agents such as trichloroethylene and mercaptans, pH controlling agents, and polymerization initiators such as diisopropylperoxy dicarbonate, α,α'-azobis-2,4-dimethyl valeronitrile, lauroyl peroxide, potassium persulfate, cumene hydroperoxide and p-menthane hydroperoxide. The effectiveness of the inventive method is little affected by the kinds and amounts of these additive ingredients.

The method of the present invention is applicable to the polymerization of various kinds of ethylenically unsaturated monomers including vinyl halides such as vinyl chloride, vinyl esters such as vinyl acetate and vinyl propionate, acrylic and methacrylic acids and esters thereof, maleic and fumaric acids and esters thereof or maleic anhydride, dienic monomers such as butadiene, chloroprene and isoprene, styrene, acrylonitrile, vinylidene halides, vinyl ethers and the like. The effect of the inventive method is particularly effectively exhibited in the suspension polymerization or emulsion polymerization of a vinyl halide such as vinyl chloride or vinylidene halide such as vinylidene chloride and copolymerization of a monomer mixture mainly composed of these monomers.

Of course, the pearl polymerization of styrene, methyl methacrylate, acrylonitrile and other monomers may also be improved by the application of the inventive method by the decreased polymer scale build up on the reactor walls when the polymerization is performed in a stainless steel-made reactor. The efficiency of the preparation of latices of synthetic rubbers, e.g. SBR, NBR, CR, IR, IIR and the like, and ABS resins, which is usually undertaken by the emulsion polymerization, can also be greatly improved according to the inventive method.

In the following, the method of the present invention is described in further detail by way of examples, in which the preparation of the condensation products as the coating materials is first described.

EXAMPLE 1

A mixture composed of 1.00 mole of aniline, 0.227 mole of nitrobenzene, 0.310 mole of hydrochloric acid in the form of a 35% aqueous solution and 0.103 mole of iron(III) chloride was heated first at 60° C. for 6 hours followed by temperature elevation up to 180° to 185° C. where the mixture was kept with agitation for 15 hours with continuous distilling off of water. The aniline and nitrobenzene distilled out as accompanied by the water were returned to the reaction vessel during the reaction. Thereafter, the temperature of the reaction mixture was further increased to 200° C. and agitation was continued at this temperature for further 5 hours to complete the condensation reaction.

The thus formed reaction product in a molten state was poured into a large volume of a diluted hydrochloric acid and heated at 60° C. for 3 hours. The mixture was then filtered while it was still hot to remove the unreacted aniline in the form of the hydrochloride dissolved in the aqueous phase and the filtered cake was washed 5 to 6 times with water to remove the hydrochloric acid followed by drying to give the condensation product. The yield of this product was 45.2% of the total amount of the aniline and nitrobenzene. This product is called the Condensation Product I hereinafter.

Condensation Products II to XX were prepared each in a similar manner to the preparation of the Condensation Product I with the formulation as indicated in Table 1 below for the aromatic amine compound, aromatic nitro compound, mineral acid and condensation catalyst as well as the amounts thereof. Table 1 also gives the yields of the respective condensation products calculated on the total amounts by weight of the aromatic amine and nitro compounds.

Further, Condensation Product XXI was prepared in a following manner. Thus, a mixture composed of 1.00 mole of aniline and 0.310 mole of 35% hydrochloric acid was chilled at 10° C. or below and, after admixing of 0.103 mole of iron(III) chloride, heated to a temperature of 60° C. where it was agitated for 6 hours to effect the condensation reaction of aniline alone. The temperature of this reaction mixture, without removing the unreacted aniline, was increased to 170° C. to distil out water and, while keeping the mixture at this temperature, 0.227 mole of nitrobenzene was added to the reaction mixture over a period of 6 hours followed by rapid temperature increase up to 180° to 185° C. where the reaction was continued for 15 hours. During this reaction period, water formed by the condensation reaction was distilled out together with small volumes of aniline and nitrobenzene and the aniline and nitrobenzene were separated from water and returned to the reaction vessel. Thereafter, the temperature of the reaction mixture was further increased to 200° C. and the reaction was completed by agitating the reaction mixture for additional 5 hours at this temperature.

The thus obtained reaction product in a molten state was poured into a large volume of a diluted hydrochloric acid and heated for 3 hours at 60° C. followed by filtration while the mixture was still hot to remove the unreacted aniline dissolved in the aqueous phase. The filtered cake was washed 6 times with water to remove the hydrochloric acid followed by drying to give the condensation product. The yield of this condensation product was 39.2% based on the total amount of the aniline and nitrobenzene initially used.

EXAMPLE 2

(Experiments No. 1 to No. 15)

Coating solutions were prepared each by dissolving 1.0 g of either one of the condensation products I to XII prepared in Example 1 in 100 g of methyl alcohol. The coating solution was applied to the inner walls of a stainless steel polymerization reactor and the stirrer thereof coming into contact with the monomer during polymerization followed by drying at 50° C. for 10 minutes. The coating amount was 0.1 g/m$^2$ as dried.

TABLE 1

| Condensation Product No. | Aromatic amine compound (moles) | Aromatic nitro compound (moles) | Mineral acid (moles) | Condensation catalyst (moles) | Yield % |
|---|---|---|---|---|---|
| I | Aniline (1.00) | Nitrobenzene (0.227) | Hydrochloric (0.310) | Iron(III) chloride (0.103) | 45.2 |
| II | 4-Methyl-aniline(1.000) | Nitrobenzene (0.262) | Hydrochloric (0.358) | Ammonium persulfate (0.118) | 40.5 |
| III | Aniline(0.349) + 1,4-phenylene-diamine(0.370) | Nitrobenzene (0.407) | Hydrochloric (0.334) | Ammonium persulfate (0.088) | 53.1 |

TABLE 1-continued

| Condensation Product No. | Aromatic amine compound (moles) | Aromatic nitro compound (moles) | Mineral acid (moles) | Condensation catalyst (moles) | Yield % |
|---|---|---|---|---|---|
| IV | 4-Mehtylaniline (0.630) + 4-aminodiphenylamine (0.370) | Nitrobenzene (0.330) | Hydrochloric (0.452) | Ammonium persulfate (0.089) | 45.0 |
| V | Aniline(0.664) + 4-aminodiphenylamine (0.336) | Nitrobenzene (0.402) | Hydrochloric (0.297) | Ammonium persulfate (0.098) | 55.3 |
| VI | Aniline(0.605) + 4-chloro-1,2-phenylenediamine(0.395) | 2-Nitrophenol (0.162) | Hydrochloric (0.270) | Ammonium persulfate (0.074) | 38.7 |
| VII | Aniline(0.540) + 2-aminophenol (0.460) | 4-Nitrophenol (0.217) | Hydrochloric (0.496) | Ammonium persulfate (0.044) | 60.2 |
| VIII | Aniline(0.500) + 3-aminophenol (0.500) | 4-Nitrophenetole (0.241) | Hydrochloric (0.496) | Hydrogen peroxide (0.296) + iron(II) chloride (0.004) | 57.1 |
| IX | Aniline(0.809) + 4-aminophenol (0.191) | 2-Nitrophenol (0.116) | Sulfuric (0.498) | Hydrogen peroxide (0.443) + iron(II) chloride 0.006) | 48.9 |
| X | Aniline(1.000) | 2-Aminonitrobenzene (0.222) | Sulfuric (0.462) | 4-Menthane hydroperoxide (0.162) | 45.0 |
| XI | Aniline(0.682) + 4-amino-4'-hydroxydiphenylamine (0.318) | 3-Nitroanisole (0.290) | Hydrochloric (0.296) | Sodium iodate (0.118) | 36.7 |
| XII | Aniline(0.607) + 2-amino-4-chlorophenol (0.393) | 2-Chloronitrobenzene (0.215) | Hydrochloric (0.263) | Sodium chlorate (0.239) | 40.5 |
| XIII | Aniline(0.578) + 4-chloroaniline (0.422) | 4-Nitrobenzoic acid (0.148) | Hydrochloric (0.310) | Dibenzoyl peroxide (0.107) | 30.5 |
| XIV | Aniline(0.278) + 4-methylaniline (0.722) | 3-Nitrophenol (0.335) | Hydrochloric (0.298) | Copper(II) chloride (0.126) | 42.0 |
| XV | 4-Aminodiphenylamine(0.370) + 1,3-phenylenediamine (0.630) | 4-Nitrobenzenesulfonic acid (0.243) | Hydrochloric (0.393) | Manganese dioxide (0.330) | 52.1 |
| XVI | 4-Aminodiphenylamine(0.400) + 1,2-phenylenediamine (0.600) | 4-Aminonitrobenzene (0.296) | Hydrochloric (0.393) | Iron(III) chloride (0.096) | 55.3 |
| XVII | Aniline(0.538) + 1,2-phenylenediamine (0.462) | 4-Chloronitrobenzene (0.203) | Hydrochloric (0.286) | Ammonium persulfate (0.132) | 47.1 |
| XVIII | Aniline(1.000) | Nitrobenzene (0.227) | Hydrochloric (0.310) | Iron(II) chloride | 40.1 |
| XIX | Aniline(1.000) | Nitrobenzene (0.060) | Hydrochloric (0.310) | Iron(III) chloride (0.103) | 20.1 |
| XX | Aniline(1.000) | Nitrobenzene (0.755) | Hydrochloric (0.310) | Iron(III) chloride (0.103) | 40.1 |

Into the thus treated polymerization reactor were introduced 200 kg of vinyl chloride monomer, 400 kg of water, 250 g of partially saponified polyvinyl alcohol, 25 g of hydroxypropyl methylcellulose and 75 g of diisopropylperoxy dicarbonate to form a polymerization mixture and the polymerization was carried out by agitating the mixture at 57° C. for 10 hours.

After completion of the polymerization reaction, the aqueous slurry of the polymerizate was discharged out of the reactor and the amount of the polymer scale deposition on the reactor walls was examined to give the results shown in Table 2 below. In this table, the results of Experiments No. 14 and No. 15 were quite unsatisfactory because of the improper ratios of the aniline and nitrobenzene in the preparation of the respective condensation products XIX and XX.

TABLE 2

| Experiment No. | Condensation Product No. | Polymer scale deposition, g/m² |
| --- | --- | --- |
| 1 | None | 1300 |
| 2 | II | 0 |
| 3 | III | 0 |
| 4 | VII | 1 |
| 5 | V | 0 |
| 6 | X | 0 |
| 7 | XIII | 2 |
| 8 | VI | 1 |
| 9 | XIV | 0 |
| 10 | XVII | 0 |
| 11 | IX | 1 |
| 12 | XVIII | 10 |
| 13 | XVI | 0 |
| 14 | XIX | 300 |
| 15 | XX | 300 |

EXAMPLE 3

(Experiments No. 16 to No. 25)

Coating solutions were prepared each by dissolving 1.0 g of either one of the condensation products obtained in Example 1 in 100 g of methyl alcohol and the inner walls of a 100 liter capacity stainless steel-made polymerization reactor and other surfaces coming into contact with the monomer during polymerization were coated with the coating solution followed by drying at 60° C. for 5 minutes. The coating amount was 0.1 g/m² as dried.

Into the thus treated polymerization reactor were introduced 27.6 kg of vinyl chloride monomer, 2.4 kg of vinyl acetate monomer, 60 kg of water, 27.3 g of a partially saponified polyvinyl alcohol, 11.7 g of hydroxypropyl methylcellulose, 75 g of trichloroethylene and 15 g of α,α'-dimethylvaleronitrile to form a polymerization mixture and the polymerization was performed by agitating the polymerization mixture heated at 57° C. for 7 hours.

After completion of the polymerization reaction, the aqueous slurry of the polymerizate was discharged out of the reactor and the amount of the polymer scale deposition on the reactor walls was examined to give the results shown in Table 3 below. In this table, Experiments No. 24 and No. 25 were carried out each by using a condensation product prepared in the same manner as the Condensation Product I or VIII except that the aromatic nitro compound was omitted from the formulation of the condensation reaction. That is, the coating materials in these experiments were the condensation products of the aromatic amine compounds alone. It is noteworthy that the results in these comparative experiments are very poor in comparison with the results of Experiments No. 18 and No. 22 using the Condensation Products VIII and I, respectively.

TABLE 3

| Experiment No. | Condensation Product No. | Polymer scale deposition g/m² |
| --- | --- | --- |
| 16 | None | 2000 |
| 17 | IV | 0 |
| 18 | VIII | 1 |
| 19 | XI | 0 |
| 20 | XII | 0 |
| 21 | XV | 1 |
| 22 | I | 0 |
| 23 | XXI | 0 |
| 24 | * | 1200 |
| 25 | * | 1000 |

* See text for the coating material.

EXAMPLE 4

(Experiments No. 26 to No. 34)

A mixture composed of 30 g of the Condensation Product II shown in Table 1, 150 g of water and 4.1 g of sodium hydroxide was heated in an autoclave at 130° C. for 2 hours. The resultant reaction mixture was then filtered, washed with water and dried to give a basified condensation product, which is referred to as the Condensation Product IIB hereinafter. Similarly, Condensation Products IB, VIB, IXB, XIIB, XIIIB, XIVB and XVIIIB were prepared from the respective condensation products.

Coating solutions were prepared each by dissolving 1.0 g of either one of the above prepared basified condensation products in 100 g of a 50:50 by volume solvent mixture of methyl alcohol and toluene and the inner walls of a 100 liter capacity polymerization reactor made of stainless steel and other surfaces coming into contact with the monomer during polymerization were coated with the coating solution followed by drying at 70° C. for 10 minutes. The coating amount was 0.1 g/m² as dried.

Into the thus treated polymerization reactor were introduced 26 kg of vinyl chloride monomer, 52 kg of water, 26 g of a partially saponified polyvinyl alcohol and 8 g of α,α'-dimethylvaleronitrile to form a polymerization mixture and polymerization was performed by agitating the polymerization mixture heated at 57° C. for 10 hours.

After completion of the polymerization reaction, the aqueous slurry of the polymerizate was discharged out of the polymerization reactor and the amount of the polymer scale deposition on the reactor walls was examined to give the results shown in Table 4 below.

TABLE 4

| Experiment No. | Condensation Product No. | Polymer scale deposition, g/m² |
| --- | --- | --- |
| 26 | None | 1200 |
| 27 | IIB | 0 |
| 28 | VIB | 0 |
| 29 | IXB | 0 |
| 30 | XIIB | 0 |
| 31 | XIIIB | 0 |
| 32 | XIVB | 1 |
| 33 | XVIIIB | 10 |
| 34 | IB | 0 |

EXAMPLE 5

(Experiments No. 35 to No. 42)

The inner walls of a polymerization reactor of stainless steel and other surfaces coming into contact with the monomer during polymerization were coated with either one of the coating solutions prepared in Examples 2, 3 and 4 above as indicated in Table 5 below followed by drying at 50° C. for 15 minutes. The coating amount was 0.1 g/m² as dried.

Into the thus treated polymerization reactor were introduced 50 kg of styrene monomer, 50 kg of water, 250 g of a partially saponified polyvinyl alcohol and 150 g of dibenzoyl peroxide to form a polymerization mixture and polymerization was performed by agitating the polymerization mixture heated at 90° C. for 7 hours.

After completion of the polymerization reaction, the aqueous slurry of the polymerizate was discharged out of the reactor and the amount of the polymer scale deposition on the reactor walls was examined to give the results shown in Table 5 below.

TABLE 5

| Experiment No. | Condensation Product No. | Polymer scale deposition, g/m² |
|---|---|---|
| 35 | None | 800 |
| 36 | II | 1 |
| 37 | VII | 2 |
| 38 | XVIII | 10 |
| 39 | IV | 1 |
| 40 | XII | 3 |
| 41 | I | 1 |
| 42 | XIVB | 0 |

EXAMPLE 6

(Experiments No. 43 to No. 50)

The inner walls of a 1000 liter capacity polymerization reactor made of stainless steel and other surfaces coming into contact with the monomer during polymerization were coated with either one of the coating solutions prepared in Example 2 and 3 as indicated in Table 6 below followed by drying at 50° C. for 10 minutes and thorough washing with water. The coating amount was 0.1 g/m² as dried.

Into the thus treated polymerization reactor was introduced 200 kg of vinyl chloride monomer, 400 kg of water, 2.5 kg of sodium laurylsulfate and 0.13 kg of potassium persulfate to form a polymerization mixture and emulsion polymerization of the monomer was performed by agitating the polymerization mixture heated at 57° C. for 10 hours.

After completion of the polymerization reaction, the aqueous polymer emulsion was discharged out of the reactor and the amount of the polymer scale deposition on the reactor walls was examined to give the results shown in Table 6 below.

TABLE 6

| Experiment No. | Condensation Product No. | Polymer scale deposition g/m² |
|---|---|---|
| 43 | None | 1100 |
| 44 | II | 0 |
| 45 | VII | 1 |
| 46 | XVII | 1 |
| 47 | XVIII | 10 |
| 48 | XI | 2 |
| 49 | I | 0 |
| 50 | XV | 1 |

EXAMPLE 7

(Experiments No. 51 to No. 57)

The polymerization run was performed in substantially the same manner as in Example 2 in a polymerization reactor coated in advance with either one of the coating solutions indicated in Table 7 below followed by drying at 50° C. for 10 minutes and then thorough washing with water.

After completion of a run of the polymerization, the polymerizate slurry was discharged out of the reactor and, after washing the reactor walls with water, another polymerization run was performed in the same polymerization reactor under the same polymerization conditions.

The polymerization runs were repeated in this manner with examination of the polymer scale deposition after each of the runs and the number of the polymerization runs which could be performed without resulting in an amount of the polymer scale deposition in excess of 1 g/m² was recorded to give the results shown in Table 7 below.

TABLE 7

| Experiment No. | Condensation Product No. | Number of polymerization runs with effective scale prevention |
|---|---|---|
| 51 | XII | 25 |
| 52 | XVII | 30 |
| 53 | XIV | 40 |
| 54 | IV | 33 |
| 55 | XI | 38 |
| 56 | IB | 50 |
| 57 | I | 80 |

What is claimed is:

1. A method, in the polymerization of an ethylenically unsaturated polymerizable monomer in an aqueous medium contained in a polymerization reactor, for preventing deposition of polymer scale on the surfaces of the inner walls of the polymerization reactor and other parts coming into contact with the monomer during the polymerization which comprises, prior to the polymerization, providing a coating layer on the surface formed of a condensation product prepared by the condensation reaction of at least one aromatic amine compound selected from the class consisting of aniline, 1,2- 1,3- and 1,4-phenylenediamines, 2-, 3- and 4-aminophenols, 4-aminodiphenylamine and 4,4'-diaminodiphenylamine, and at least one aromatic nitro compound selected from the class consisting of nitrobenzene, 2-, 3- and 4-nitrophenols, 2-, 3- and 4-nitrobenzoic acids and 2-, 3- and 4-nitrobenzenesulfonic acids, in the presence of a mineral acid and a condensation catalyst at a temperature in the range from 100° to 250° C., wherein the amount of the aromatic nitro compound in the condensation reaction is in the range from 0.10 to 0.50 mole per mole of the aromatic amine compound.

2. The method as claimed in claim 1 wherein the mineral acid is selected from the class consisting of hydrochloric acid, sulfuric acid, nitric acid, phosphoric acid and hydrobromic acid.

3. The method as claimed in claim 1 wherein the coating layer is provided of the condensation product basified by use of an alkali or an ammonium compound.

4. The method as claimed in claim 1 wherein the coating amount of the coating layer is in the range from 0.001 to 5 g/m² of the surface.

5. The method as claimed in claim 1 wherein the condensation catalyst is selected from the group consisting of hydrogen peroxide as combined with iron(II) chloride, dibenzoyl peroxide, potassium persulfate, ammonium persulfate, p-menthane hydroperoxide, iodic acid, sodium and potassium iodates, sodium and potassium chlorates, iron(III) chloride, copper(II) chloride and manganese dioxide.

* * * * *